United States Patent
Choi et al.

(10) Patent No.: US 9,191,700 B2
(45) Date of Patent: Nov. 17, 2015

(54) ENCODING GUARD BAND DATA FOR TRANSMISSION VIA A COMMUNICATIONS INTERFACE UTILIZING TRANSITION-MINIMIZED DIFFERENTIAL SIGNALING (TMDS) CODING

(71) Applicant: Lattice Semiconductor Corporation, Portland, OR (US)

(72) Inventors: Hoon Choi, Mountain View, CA (US); Laurence A. Thompson, Saratoga, CA (US)

(73) Assignee: Lattice Semiconductor Corporation, Portland, OR (US)

( * ) Notice: Subject to any disclaimer, the term of this patent is extended or adjusted under 35 U.S.C. 154(b) by 0 days.

(21) Appl. No.: 14/278,255

(22) Filed: May 15, 2014

(65) Prior Publication Data
US 2014/0340579 A1 Nov. 20, 2014

Related U.S. Application Data

(60) Provisional application No. 61/824,343, filed on May 16, 2013.

(51) Int. Cl.
*H04N 7/035* (2006.01)
*H04N 7/08* (2006.01)
(Continued)

(52) U.S. Cl.
CPC .......... *H04N 21/43635* (2013.01); *G06F 13/00* (2013.01)

(58) Field of Classification Search
CPC . G06F 13/00; H04N 21/43635; H04N 7/0357
USPC ........... 348/465, 461, 473, 474, 423.1, 425.2; 370/464; 375/259, 260
See application file for complete search history.

(56) References Cited

U.S. PATENT DOCUMENTS 6,914,637 B1 7/2005 Wolf et al.
7,088,398 B1 * 8/2006 Wolf et al. .................. 348/423.1
(Continued)

OTHER PUBLICATIONS

"High-Definition Multimedia Interface," Specification Version 1.3a, Hitachi, Ltd. et al., Nov. 10, 2006, 276 pages, [Online] [Retrieved on Apr. 8, 2015] Retrieved from the Internet<URL:http://www.microprocessor.org/HDMISpecification13a.pdf>.

(Continued)

*Primary Examiner* — Jefferey Harold
*Assistant Examiner* — Jean W Desir
(74) *Attorney, Agent, or Firm* — Fenwick & West LLP (57) ABSTRACT

The present disclosure is related to a hardware component for communications over a multimedia communication interface. In one embodiment, a hardware component includes a disparity circuit that stores a disparity value. The disparity value indicates the disparity between the number of "1"s and the number of "0"s previously transmitted by the hardware component. The hardware component also includes circuitry for receiving multimedia data to be scrambled, encoded and transmitted by the hardware component. In one embodiment, the multimedia data includes video data and data island data. In one embodiment, the hardware component generates transition minimized intermediate codes based on values in the guard band data included within the video data and data island data. The hardware component generates encoded guard band codes that are transition minimized as well as direct current balanced. The hardware component transmits the encoded guard band codes over a differential pair of the multimedia communication device.

20 Claims, 9 Drawing Sheets

(51) Int. Cl.
*H04N 21/4363* (2011.01)
*G06F 13/00* (2006.01)

(56) References Cited

U.S. PATENT DOCUMENTS

2007/0011720 A1 1/2007 Min
2009/0147864 A1 6/2009 Lida et al.
2009/0278984 A1 11/2009 Suzuki et al.
2010/0135380 A1 6/2010 Pasqualino
2014/0269954 A1* 9/2014 Whitby-Strevens .......... 375/259

OTHER PUBLICATIONS

PCT International Search Report and Written Opinion, PCT Application No. PCT/US2014/038276, Sep. 30, 2014, 11 pages.

* cited by examiner

ENCODING GUARD BAND DATA FOR TRANSMISSION VIA A COMMUNICATIONS INTERFACE UTILIZING TRANSITION-MINIMIZED DIFFERENTIAL SIGNALING (TMDS) CODING

CROSS-REFERENCE TO RELATED APPLICATION(S)

This application claims priority from U.S. Provisional Patent Application No. 61/824,343, titled "Encoding Modification for Support of Scrambling" filed on May 16, 2013, the contents of which are incorporated by reference herein in their entirety.

BACKGROUND

1. Field of the Disclosure

This disclosure pertains in general to data communications, and more specifically to data transmission of guard band data using transition minimized differential signaling (TMDS) over a high-definition multimedia interface (HDMI or MHL) cable.

2. Description of the Related Art

Different types of multimedia data are often transmitted from a source device to a sink device over a cable, such as a HDMI cable that uses differential signaling. The information transmitted across the cable is often repetitive in nature, which causes unwanted electro-magnetic interference (EMI). To address the EMI, video data can be encoded with transition minimized differential signaling (TMDS) to minimize transitions and create DC balance in the video data. However, even when TMDS is applied to the video data, a significant amount of EMI still remains in the system.

SUMMARY

Embodiments of the present disclosure are related to a hardware component or representations of a hardware component, for communications over a multimedia communication interface. In one embodiment, a hardware component includes a disparity circuit that stores a disparity value. The disparity value indicates the disparity between the number of "1"s and the number of "0"s previously transmitted by the hardware component. The hardware component also includes circuitry for receiving multimedia data to be scrambled, encoded and transmitted by the hardware component. In one embodiment, the multimedia data includes video data and data island data. The data island data includes auxiliary information and audio information. In one embodiment, the video data and auxiliary data also includes guard band data either trailing or preceding packets or information data within the video data and the data island data.

In one embodiment, the hardware component generates transition minimized intermediate codes based on values in the guard band data. The hardware component then generates encoded guard band codes that are transition minimized as well as direct current balanced based on the transition minimized guard band codes and the disparity value stored in the disparity counter. The hardware component then transmits the encoded guard band codes over a differential pair of the multimedia communication device. In another embodiment, the guard band data is scrambled prior to being encoded and transmitted.

BRIEF DESCRIPTION OF THE DRAWINGS

The teachings of the embodiments disclosed herein can be readily understood by considering the following detailed description in conjunction with the accompanying drawings.

DETAILED DESCRIPTION

The Figures (FIG.) and the following description relate to various embodiments by way of illustration only. It should be noted that from the following discussion, alternative embodiments of the structures and methods disclosed herein will be readily recognized as viable alternatives that may be employed without departing from the principles discussed herein. Reference will now be made in detail to several embodiments, examples of which are illustrated in the accompanying figures. It is noted that wherever practicable similar or like reference numbers may be used in the figures and may indicate similar or like functionality.

Figure 1:
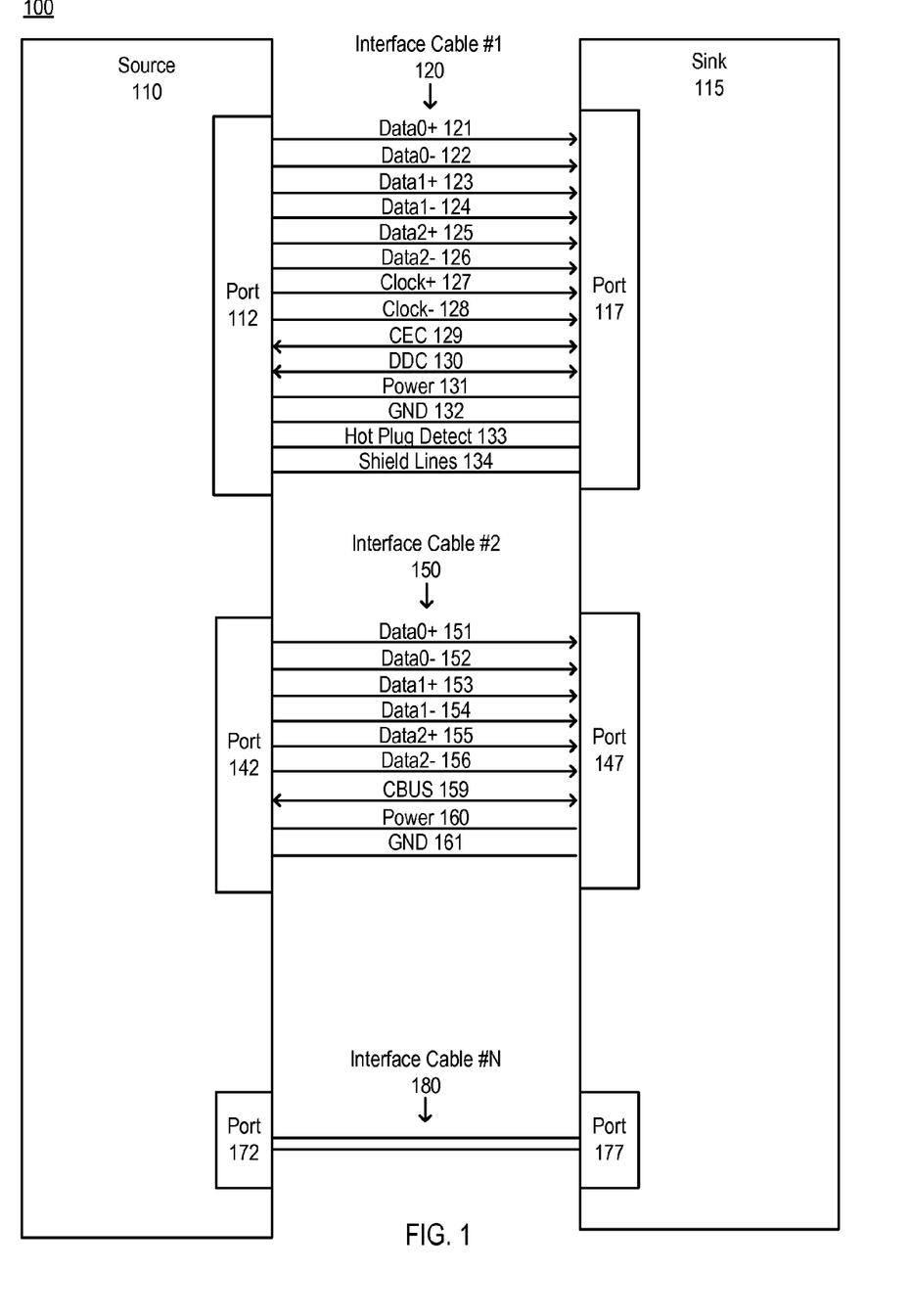
FIG. 1 is a high-level block diagram of a system for data communications, according to one embodiment.

FIG. 1 is a high-level block diagram of a system 100 for data communications, according to one embodiment. The system 100 includes a source device 110 communicating with a sink device 115 through one or more interface cables 120, 150, 180. Source device 110 transmits multimedia data streams (e.g., audio/video streams) to the sink device 115 and also exchanges control data with the sink device 115 through the interface cables 120, 150, 180. In one embodiment, source device 110 and/or sink device 115 may be repeater devices.

Source device 110 includes physical communication ports 112, 142, 172 coupled to the interface cables 120, 150, 180. Sink device 115 also includes physical communication ports 117, 147, 177 coupled to the interface cables 120, 150, 180. Signals exchanged between the source device 110 and the sink device 115 across the interface cables pass through the physical communication ports.

Source device 110 and sink device 115 exchange data using various protocols. In one embodiment, interface cable 120 represents a High Definition Multimedia Interface (HDMI) cable. The HDMI cable 120 supports differential signals transmitted via data0+ line 121, data0– line 122, data1+ line 123, data1– line 124, data2+ line 125, and data2– line 126. The HDMI cable 120 may further include differential clock lines clock+ 127 and clock– 128; Consumer Electronics Control (CEC) control bus 129; Display Data Channel (DDC) bus 130; power 131, ground 132; hot plug detect 133; and four shield lines 844 for the differential signals. In some embodiments, the sink device 115 may utilize the CEC control bus 129 for the transmission of closed loop feedback control data to source device 110.

In one embodiment, interface cable 150 represents a Mobile High-Definition Link (MHL) cable. The MHL cable 150 supports differential signals transmitted via data0+ line 151, data0− line 152, data1+ line 153, data1− line 154, data2+ line 155 and data2− line 156. In some embodiments of MHL, there may only be a single pair of differential data lines (e.g., 151 and 152). Embedded common mode clocks are transmitted through the differential data lines. The MHL cable 150 may further include a control bus (CBUS) 159, power 160 and ground 161. The CBUS 159 carries control information such as discovery data, configuration data and remote control commands.

Embodiments of the present disclosure relate to a system that scrambles and encodes guard band data for transmission across the differential pairs of an interface cable such as an HDMI cable 120. Each differential pair represents a single communication channel. The guard band data is scrambled and encoded to minimize electro-magnetic interference (EMI) and radio-frequency interference (RFI) while transmitting the data across the HDMI cable 120. In one embodiment, the guard band data is encoded using transition minimized differential signaling (TMDS).

In one embodiment, a representation of the source device 110, the sink device 115, or components within the source device 110 or sink device 115 may be stored as data in a non-transitory computer-readable medium (e.g. hard disk drive, flash drive, optical drive). These representations may be behavioral level, register transfer level, logic component level, transistor level and layout geometry-level descriptions.

Figure 2:
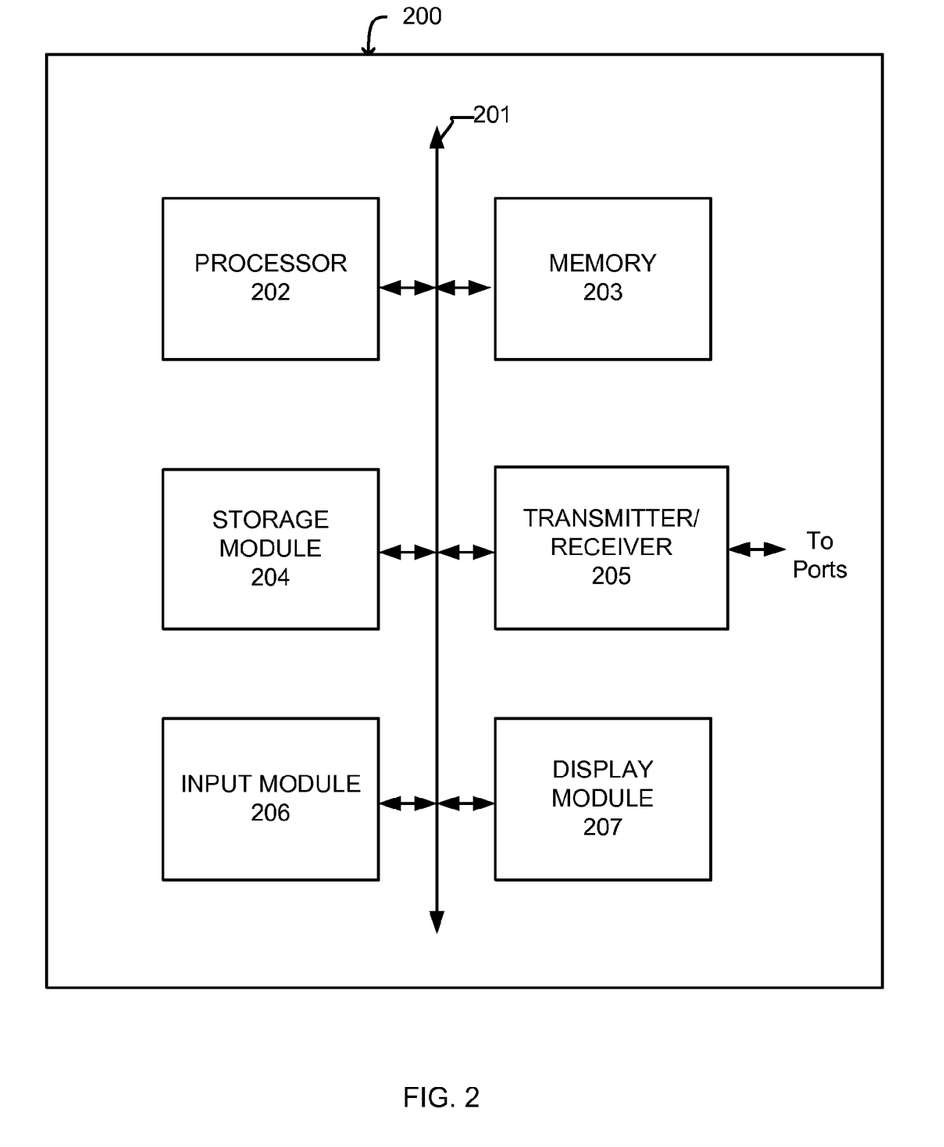
FIG. 2 is a detailed view of a computing device suitable for use as the source device or sink device of FIG. 1, according to one embodiment.

FIG. 2 is a detailed view of a computing device 200 suitable for use as the source device 110 or sink device 115 from FIG. 1, according to one embodiment. The computing device 200 can be, for example, a cell phone, a television, a laptop, a tablet, etc. The computing device 200 includes components such as a processor 202, a memory 203, a storage module 204, an input module (e.g., keyboard, mouse, and the like) 206, a display module 207 (e.g. liquid crystal display, organic light emitting display, and the like) and a transmitter or receiver 205, exchanging data and control signals with one another through a bus 201.

The storage module 204 is implemented as one or more non-transitory computer readable storage media (e.g., hard disk drive, solid state memory, etc), and stores software instructions that are executed by the processor 202 in conjunction with the memory 203. Operating system software and other application software may also be stored in the storage module 204 to run on the processor 202.

The transmitter or receiver 205 is coupled to the ports for reception or transmission of multimedia data and control data. Multimedia data that is received or transmitted may include video data streams or audio-video data streams, such as HDMI and MHL data. The multimedia data may be encrypted for transmission using an encryption scheme such as HDCP (High-Bandwidth Digital-Content Protection).

Figure 3:
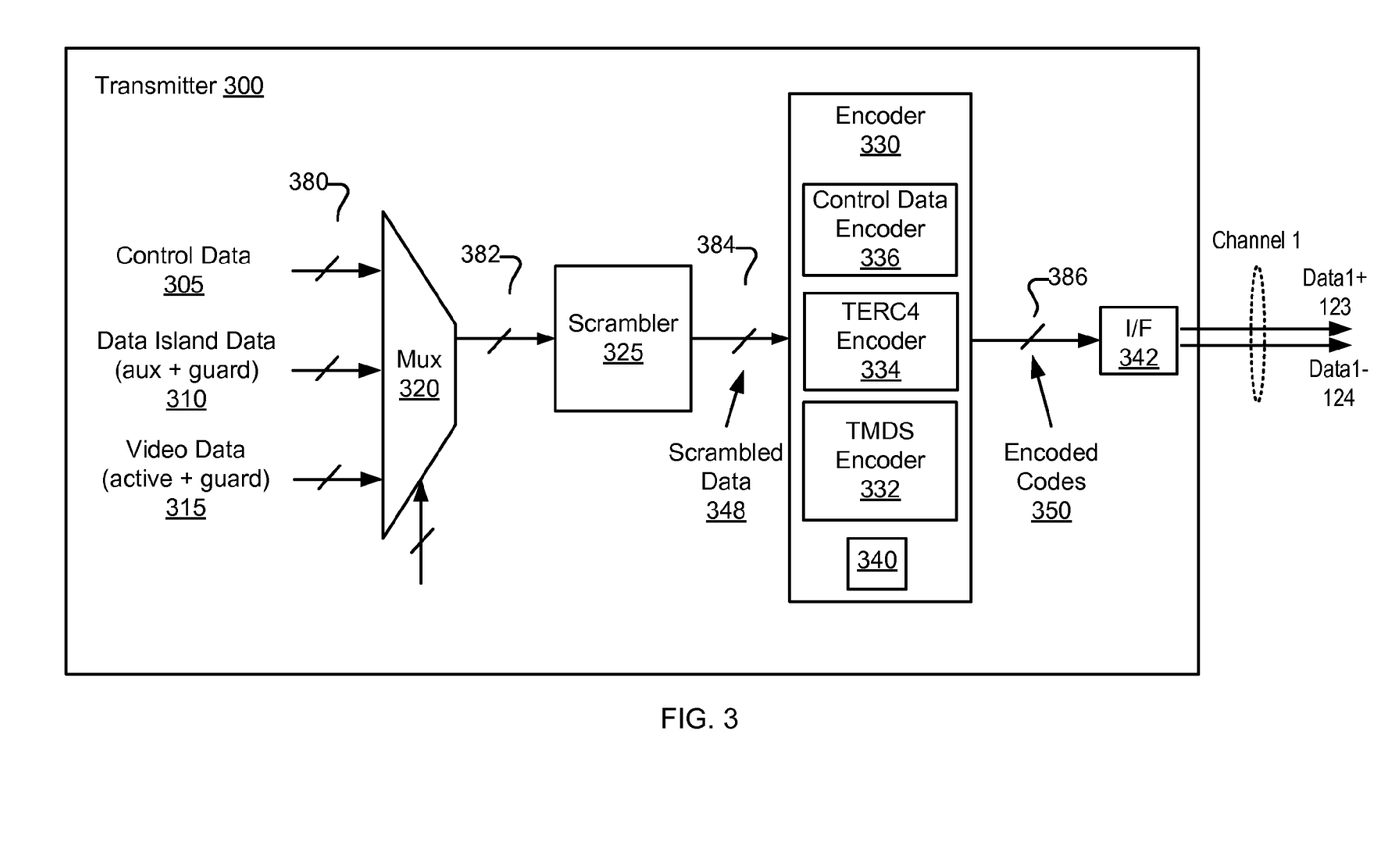
FIG. 3 is a block diagram of a transmitter for scrambling and encoding data to be transmitted via an HDMI channel, according to one embodiment.

FIG. 3 is a block diagram of a transmitter 300 for scrambling and encoding data to be transmitted via an HDMI channel, in accordance with one embodiment. The transmitter 300 may be a hardware component such as an integrated circuit (IC) found within the source device 110. The transmitter 300 includes various circuits, including a multiplexer 320 for selecting between control data 305, data island data 310 and video data 315, a scrambler 325 for scrambling the data selected by the mux 320, an encoder 330 for encoding the scrambled data and an interface 342 to an HDMI channel 1.

In one embodiment, an HDMI cable carries four differential pairs that constitute 3 data channels (channel 0, channel 1, and channel 2) and a clock channel. The 3 data channels are used to carry video data 315, data island data 310 and control data 305. The transmitter 300 receives video data 315, data island data 310 and control data 305 to be transmitted via the 3 data channels. Only the circuitry for communicating over a single HDMI data channel 1 (i.e. data lines 123 and 124) is shown in FIG. 3. The circuitry for communicating over the remaining HDMI data channels may be substantially similar to the circuitry shown in FIG. 3.

Video data 315 includes active video data and guard band data. The active video data includes video pixel information describing the color levels of pixels to be displayed on a display device, such as the sink device 115. The guard band data includes guard data to be transmitted prior to the active video data to provide a transition to the active video data. The guard band data acts as a buffer to prevent interference between the active video data and other data transmitted before the video data 315.

Data island data 310 includes auxiliary data and guard band data. The auxiliary data can include audio data associated with the active video data. The auxiliary data may also include InfoFrames, other information describing the active audio or video stream or other information describing the source device 110. The auxiliary data is transmitted using packets. The guard band data is transmitted either prior to the auxiliary data packets to provide a transition to the auxiliary data packets, or trailing the packets to provide a transition away from the auxiliary data packets. The guard band data also acts as a buffer to prevent the interference between data transmitted before or after the data island data 310 and the data island data 310.

The control data 305 includes control information. The control information may be a preamble describing the data island data 310 or video data 315. The control information may also include horizontal synchronization and vertical synchronization information.

The multiplexer 320 receives the control data 305, data island data 310 and video data 315 via one or more input signals 380. The multiplexer 320 then selects one of the control data 305, the data island data 310 or the video data 315 to pass on to its output signals 382. The multiplexer 382 cycles between the control data 305, data island data 310, and video data 315 such that different types of data are output from the multiplexer 320 at different periods of time. The different time periods will be explained in greater detail by reference to FIG. 4.

The scrambler 325 scrambles the control data 305, the data island data 310 or the video data 315 received from the multiplexer 320. Scrambling the data helps reduce the electro-magnetic interference (EMI) or the radio frequency interference (RFI) generated while transmitting the data. The scrambler 325 may apply a variety of techniques to generate scrambled data. In one example, the scrambler 325 transposes or inverts portions of the data to generate scrambled data. In another example, a linear feedback shift register (LFSR) generates a pseudo-random number and the scrambler generates scrambled data by performing an XOR operation between the data received from the mux multiplexer and the pseudo-random number generated by the LFSR. The scrambled data 348 is then sent to the encoder 330 via one or more signal 384.

The encoder 330 encodes the scrambled data 348 to further reduce EMI and RFI, thereby generating encoded character codes 350 at the output of the encoder 330. In one embodiment, the encoder includes a transition-minimized differential signaling (TMDS) encoder 332, a TMDS error reduction coding (TERC4) encoder 334, and a control data encoder 336. The encoder 330 encodes the scrambled data generated by the scrambler 325, using either the TMDS encoder 332, the TERC4 encoder 334 or the control data encoder 336, depending on the type of data that was scrambled.

The TMDS encoder 332 encodes the scrambled data into transition minimized and direct current (DC) balanced codes. In one embodiment, the TMDS encoder 332 only encodes portions of the scrambled data that correspond to (1) guard bands and (2) active video data. In other embodiments, the TMDS encoder 332 may encode other portions of the scrambled data that correspond to other types of data (e.g. auxiliary data, control data).

Guard band data can be very repetitive in nature and require frequent repeated transmission of the same value. The repetitive nature of guard band data tends to increase EMI and RFI when compared to other types of data. Thus, by scrambling and encoding guard band data, a significant reduction in EMI and RFI can be achieved.

The TMDS encoder 332 uses a disparity counter stored and maintained by a disparity circuit 340 to generate TMDS characters 350 for transmission, as described in greater detail in conjunction with FIG. 5 below. An example of a disparity circuit 340 is a register capable of storing a digital value. The disparity counter monitors the disparity between the number of "0"s (i.e. logic low bits), and the number of "1"s (i.e. logic high bits) previously transmitted in the past over a period of time. In one embodiment, the disparity value of the disparity circuit is reset to the value of 0 during control periods responsive to the encoder 330 receiving control data 305. The disparity value can also be adjusted by the TMDS encoder 332 to keep track of the DC balance of the codes output by the TMDS encoder 332 over time.

The TERC4 encoder 334 encodes scrambled auxiliary and audio data (data island 310 packet data) into TERC4 codes. TERC4 codes are generated by mapping 4-bit values in the scrambled auxiliary and audio data into pre-determined 10-bit codes. The control data encoder 336 encodes 4-bit values in the control data into 10-bit control codes. The control data encoder 336 may create control codes that are DC balanced but are not transition minimized. The control data encoder 336 typically uses a disparity value in achieving DC balance, but typically does not share the same disparity value used by the TMDS encoder 332.

The interface 342 receives the encoded codes 350 via one or more signals 386. The interface 342 serializes the encoded codes 350 and transmits differential signals for the encoded codes 350 across HDMI channel 1. The interface 342 may use current mode logic to transmit the differential signals.

Figure 4:
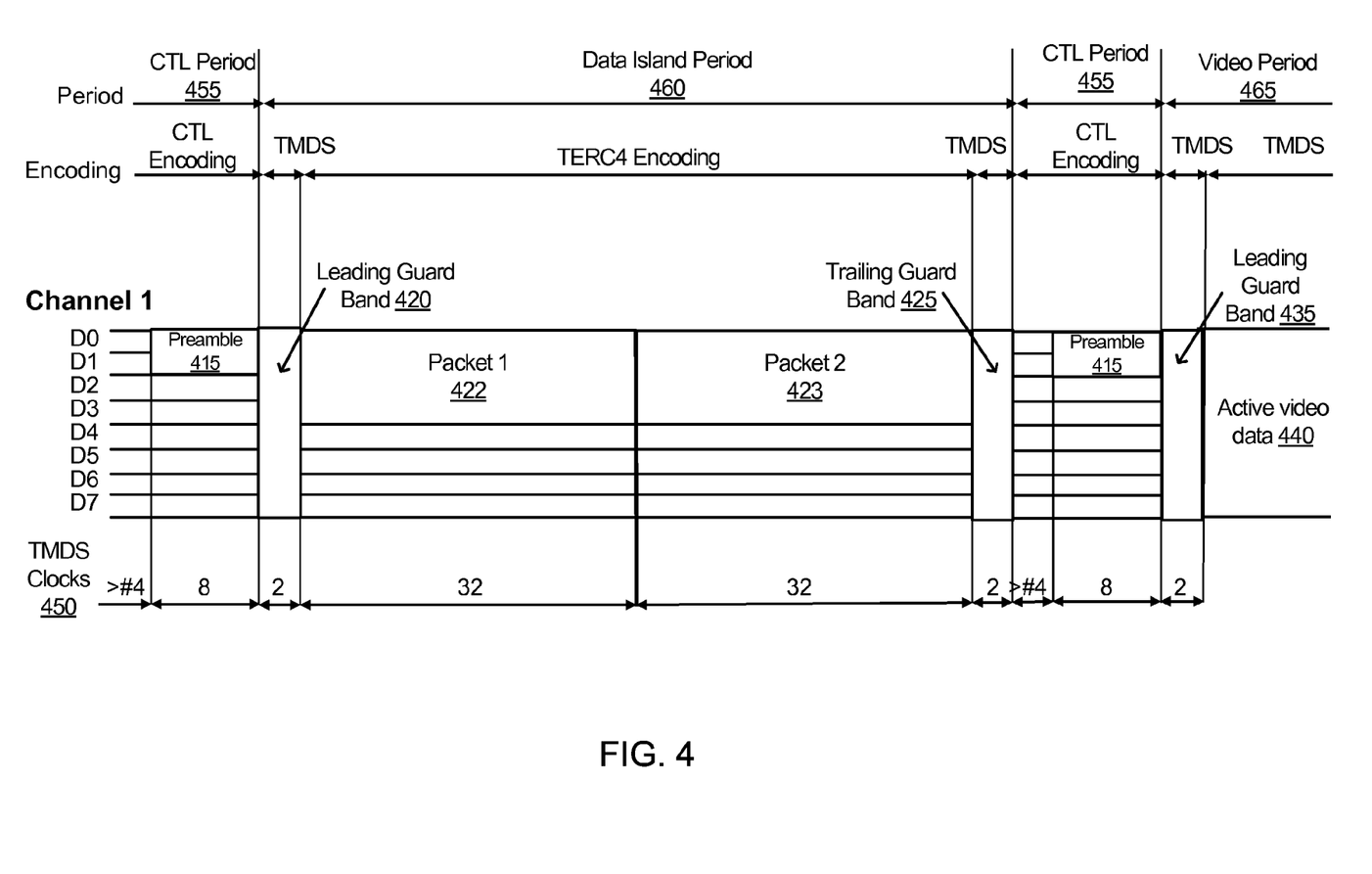
FIG. 4 is an example of how different types of data are received by the transmitter and encoded differently during different data periods for transmission over a HDMI channel, according to one embodiment.

FIG. 4 is an example of how different types of data are received by the transmitter and encoded differently during different data periods for transmission over a HDMI channel, according to one embodiment. The operation of the transmitter 300 can be divided into three different periods of time: the control period 455, the data island period 460, and the video data period 465. During these periods of time, the transmitter 300 receives up to 8 bit data values (D0-D7) in each clock cycle to be transmitted over channel 1 as 10 bit codes 350.

There are two control periods 455 in FIG. 4. A control period precedes each data island period 460, and a control period 455 also precedes each video period 465. During the control periods 455, the transmitter 300 receives and processes control data 305 representing a preamble 415. The preamble 415 is a sequence of eight identical 2-bit control characters identifying whether the data following the control data 305 is video data 315 or data island data 310. The preamble 415 is scrambled and converted into control codes by the control data encoder 336.

During the data island period 460, the transmitter 300 receives and processes data island data 310. The data island data 310 includes leading guard band data 420 and trailing guard band data 425. The leading guard band data 420 provides a transition between the first control period 455 and data island period 460. The trailing guard band data 425 provides a transition between the data island period 460 and the second control period 455. Both types of guard band data 420 and 423 are scrambled and encoded by the TMDS encoder 332 using TMDS encoding.

The data island data 310 also includes audio data in the form of packets 422 and 423. Each packet can include packet data and a header describing the type of the packet data (i.e. audio packet, null packet, InfoFrame packet). The packets 422 are scrambled and TERC4 encoded with the TERC4 encoder 334.

During the video period 465, the transmitter 300 receives and processes video data 315. The video data 310 includes leading guard band data 430 and active video data 440. The leading guard band data 420 provides a transition between the second control period 455 and the video period 460. The leading guard band data 430 as well as the active video data 440 are both scrambled and then TMDS encoded with the TMDS encoder 332

In one embodiment, the disparity value in the disparity circuit 340 is reset during the control periods 455. The disparity value is used in the data island period 460 for encoding of the leading guard band 420 and the trailing guard band 425 to maintain DC balance for the leading guard band 420 and the trailing guard band 425. The disparity value is maintained but not used during TERC4 encoding of the data island packets 422 and 423. The disparity value is also used in the video period 465 for TMDS encoding of the leading guard band 435 and active video data 440.

Note that FIG. 4 represents the operations of the transmitter 300 for HDMI channel 1. In one embodiment, the operation of the transmitter 300 for other HDMI channels is similar to that shown in FIG. 4. In another embodiment, the operation of the transmitter 300 is slightly different for HDMI channel 0. Specifically, in some embodiments, for HDMI channel 0, the transmitter 300 may apply TERC4 encoding to the guard bands 420 and 425 of the data island data 310 instead of applying TMDS encoding.

Figure 5:
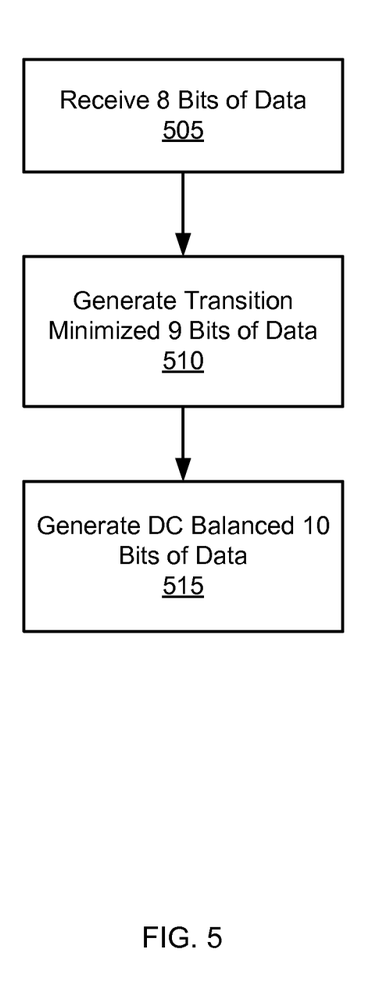
FIG. 5 shows a flowchart of a method for encoding guard band data, according to one embodiment.

FIG. 5 shows a flowchart of a method for encoding guard band data, according to one embodiment. In step 505, the TMDS encoder 332 receives 8 bits of scrambled guard band data. The scrambled guard band data can either precede or trail auxiliary data included in data island data 310, or precede active video data included in video data 315. The TMDS encoder 332 encodes the 8 bits of scrambled guard band data using a TMDS algorithm. The TMDS encoding of the guard band data is typically performed over two steps, the first aimed at reducing the number of transitions in the transmitted data, and the second aimed at generating direct current (DC) balanced data. In one embodiment, the method in FIG. 5 can also be applied to active video data.

In step 510, the TMDS encoder 332 then generates transition minimized 9 bits of data, as described in greater detail in conjunction with FIG. 6 below. The TMDS encoder 332 reduces the number of transitions of low bits to high bits or vice versa, of the 8 bits of data, to generate 510 transition minimized data. Reducing the number of transitions reduces the EMI and RFI encountered while transmitting the data.

To generate 510 the transition minimized 9 bits of data, the TMDS encoder 332 leaves the first bit untransformed, and performs either an XOR or XNOR operation on each subsequent bit against the previous bit. The TMDS encoder 332 determines whether to perform and XOR or XNOR operation by determining which of the two operations results in the fewest number of transitions. The $9^{th}$ bit, appended to the 8 bits of transformed data, identifies whether an XOR or XNOR operation was used to generate transition minimized data.

Figure 7A:
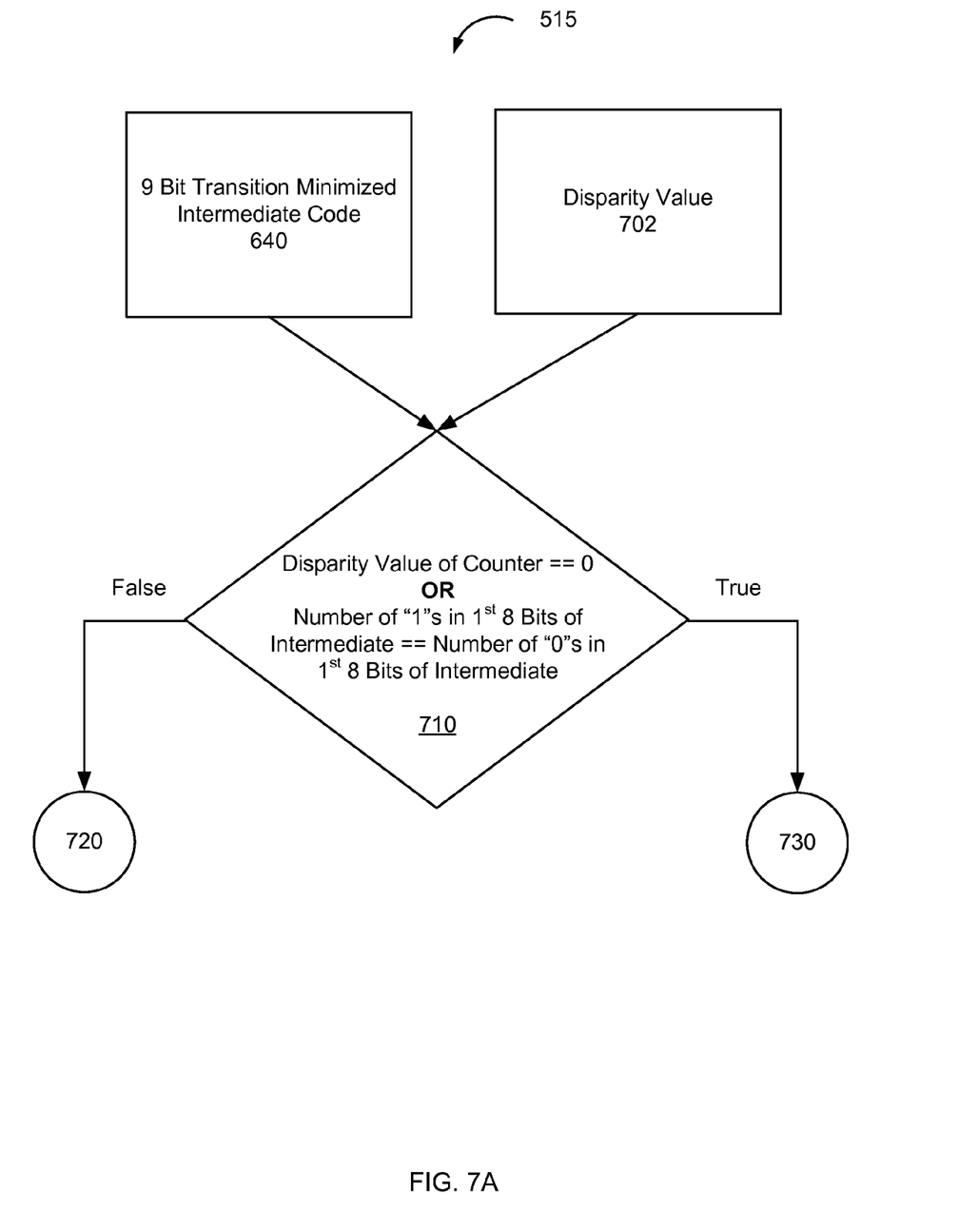
FIGS. 7A-7C show a flowchart of a method for generating 10 bits of DC balanced code, according to one embodiment.

In step 515, after generating 9 bits of transition minimized data, the TMDS encoder 332 generates 10 bits of direct current (DC) balanced data, as described in greater detail in conjunction with FIG. 7. The first 8 bits are optionally inverted to balance the number of high bits and low bits, thereby maintaining an average DC level of the bits over a series of codes 350. The $10^{th}$ bit, appended to the 9 bits of transition minimized data, identifies whether the 8 bits were inverted to balance the DC level.

Figure 6:
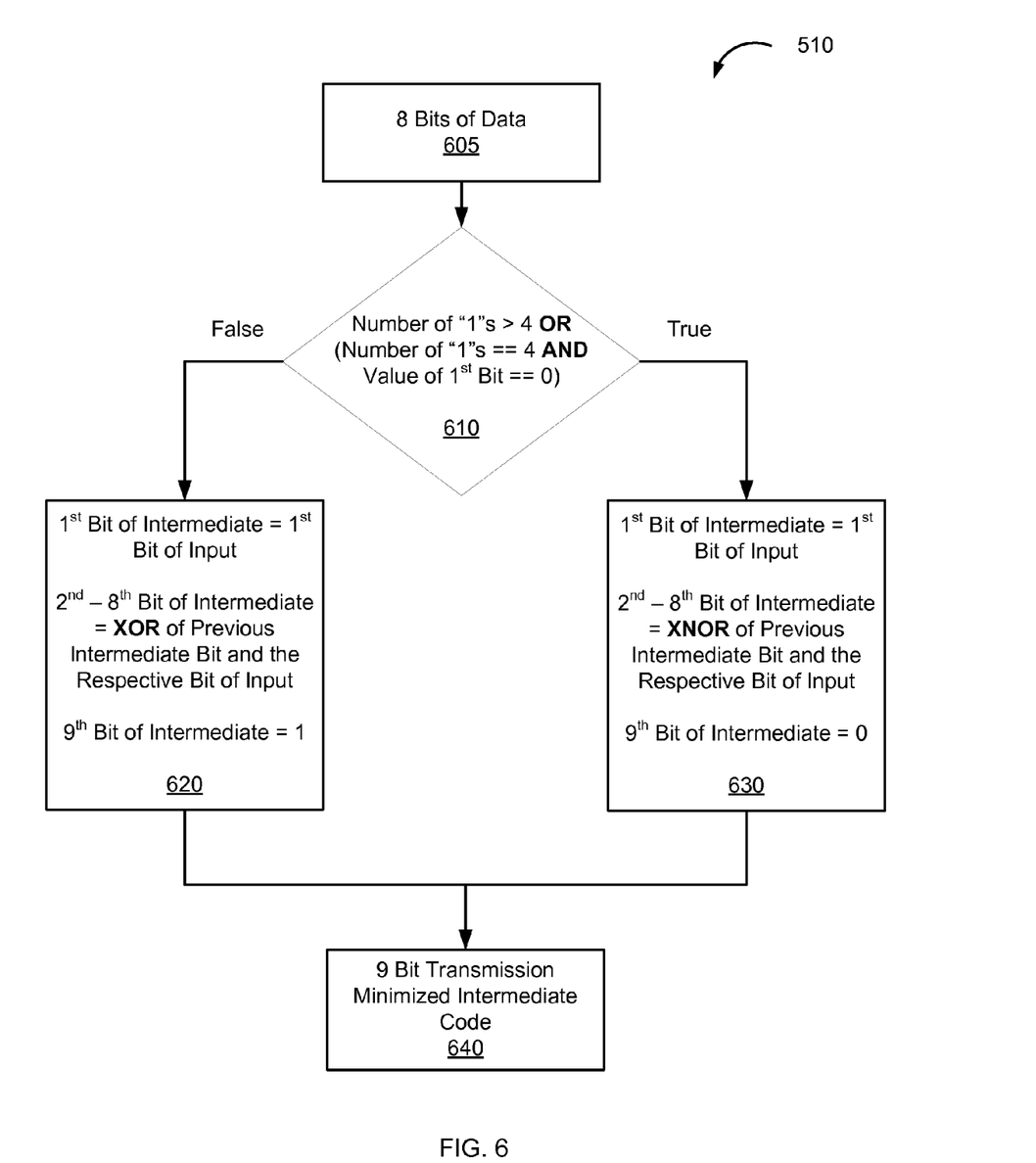
FIG. 6 shows a flowchart of a method for generating 9 bits of transition minimized intermediate code, according to one embodiment.

FIG. 6 shows a flowchart of a method for generating 9 bits of transition minimized data, according to one embodiment. The TMDS encoder 332 receives 8 bits of scrambled data. The TMDS encoder 332 performs the following logical operations to make a determination 610 regarding the 8 bits of scrambled data 605. The TMDS encoder 332 identifies the following three logical results regarding the 8 bits of scrambled data 605. The TMDS encoder 332, for the first result, identifies whether the number of "1"s or high bits, in the 8 bits of data is greater than 4. For the second result the TMDS encoder 332 identifies whether the number of "1"s is equal to 4. For the third result the TMDS encoder 332 identifies whether the value of the $1^{st}$ bit is equivalent to 0. The TMDS encoder then performs the following logical operations to make determination 610. The TMDS encoder performs an AND operation between the second result and the third result, and performs an OR operation between the result of the AND operation and the first result to arrive at determination 610.

If the determination 610 is false 620, the TMDS encoder 332 performs the following operations. The $1^{st}$ bit of an intermediate value is set to equal the $1^{st}$ bit of the 8 bits of scrambled data 605. To determine the $2^{nd}$ to $8^{th}$ bits of the intermediate value the TMDS encoder 332 performs an XOR operation between the previous bit of the intermediate value and the respective bit of the 8 bits of scrambled data 605. For example, to determine the $2^{nd}$ bit of the intermediate value the TMDS encoder 332 performs an XOR operation between the $1^{st}$ bit of the intermediate value and the $2^{nd}$ bit of the 8 bits of scrambled data 605. Similarly to determine the $3^{rd}$ bit of the intermediate value the TMDS encoder 332 performs an XOR operation between the $2^{nd}$ bit of the intermediate value and the $3^{rd}$ bit of the 8 bits of scrambled data 605. Thus, the TMDS encoder sets the $2^{nd}$ to $8^{th}$ bit of the intermediate value equal to the result determined by performing an XOR operation between the previous bit of the intermediate value and the respective bit of the 8 bits of scrambled data 605. The $9^{th}$ bit of the intermediate value is set to 1, which indicates that the XOR operation was performed on the $2^{nd}$ to $8^{th}$ bits of the 8 bits of scrambled data 605. The resulting intermediate value is a 9 bit transition minimized intermediate code 640.

On the other hand, if the determination 610 is true 630, the TMDS encoder 332 performs the following operations. The $1^{st}$ bit of the intermediate value is set to equal the $1^{st}$ bit of the 8 bits of scrambled data 605. To determine the $2^{nd}$ to $8^{th}$ bits of the intermediate value the TMDS encoder 332 performs an XNOR operation between the previous bit of the intermediate value and the respective bit of the 8 bits of scrambled data 605. For example, to determine the $2^{nd}$ bit of the intermediate value the TMDS encoder 332 performs an XNOR operation between the $1^{st}$ bit of the intermediate value and the $2^{nd}$ bit of the 8 bits of scrambled data 605. Similarly to determine the $3^{rd}$ bit of the intermediate value the TMDS encoder 332 performs an XNOR operation between the $2^{nd}$ bit of the intermediate value and the $3^{rd}$ bit of the 8 bits of scrambled data 605. Thus, the TMDS encoder sets the $2^{nd}$ to $8^{th}$ bit of the intermediate value equal to the result determined by performing an XNOR operation between the previous bit of the intermediate value and the respective bit of the 8 bits of scrambled data 605. The $9^{th}$ bit of the intermediate value is set to 0, which indicates that the XNOR operation was performed on the $2^{nd}$ to $8^{th}$ bits of the 8 bits of scrambled data 605. The resulting intermediate value is a 9 bit transition minimized intermediate code 640.

Figure 7B:
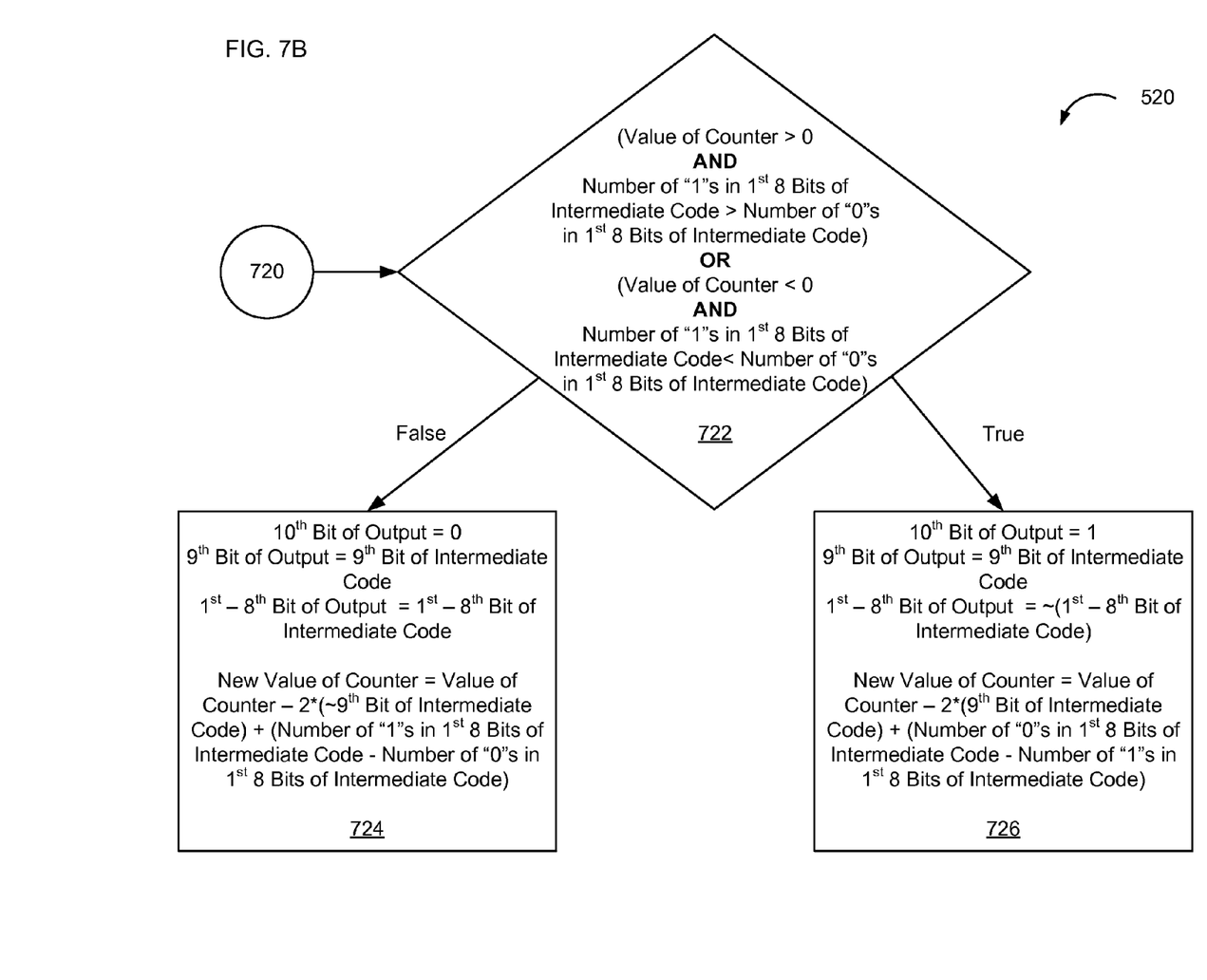
Figure 7C:
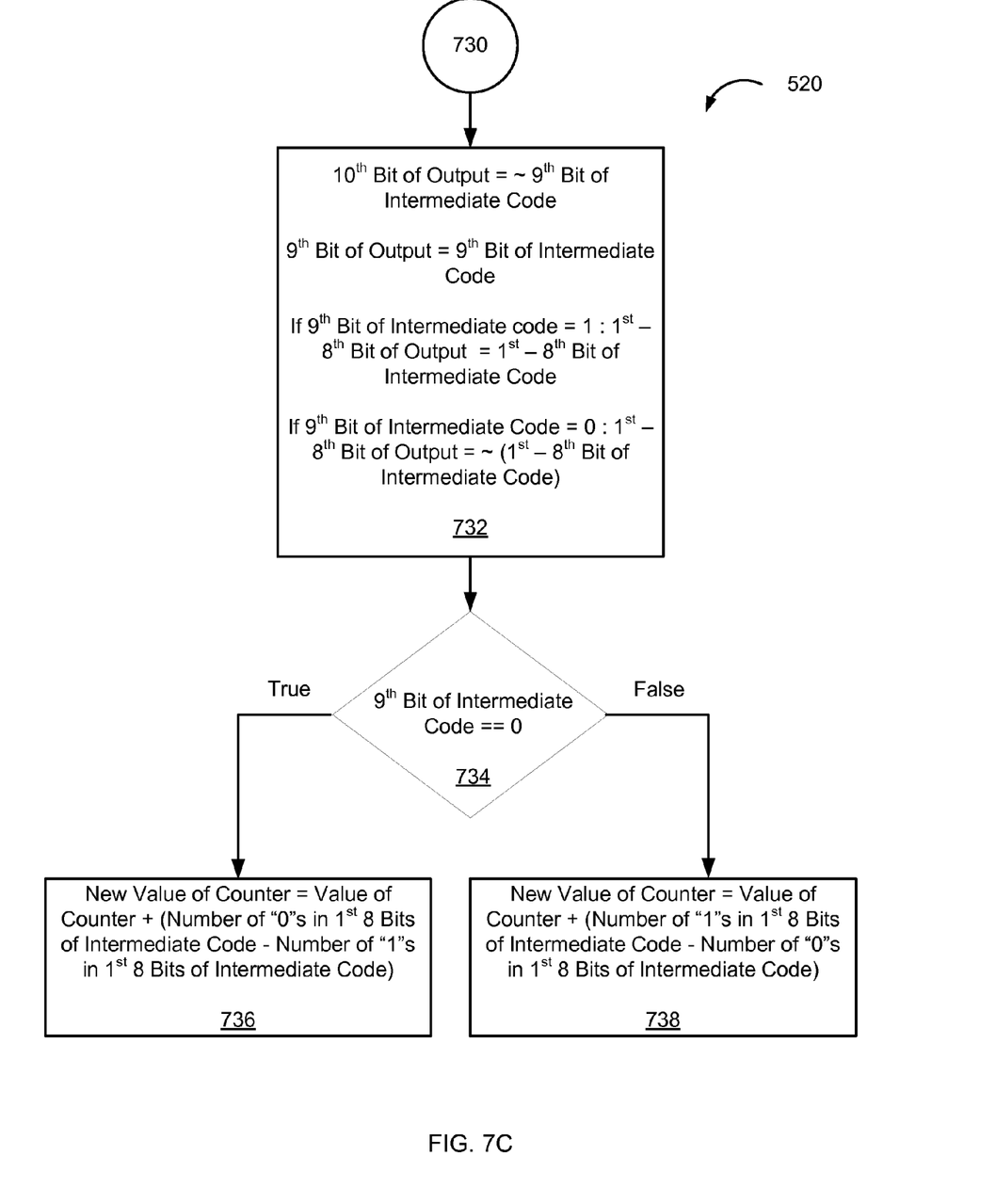

FIGS. 7A-7C show a flowchart of a method for generating 10 bits of DC balanced data, according to one embodiment. The TMDS encoder 332 performs operations on the 9 bit intermediate code 640 based on the value 702 of the disparity counter 340 to generate a 10 bit transition minimized and DC balanced code. The TMDS encoder 332 performs the following logical operations to make a determination 710 regarding the 9 bits of the intermediate code 640. The TMDS encoder 332 identifies the following two logical results regarding the 9 bits of the intermediate code 640. The TMDS encoder 332, for the first result, identifies whether the value of the disparity counter 340 is equal to 0. For the second result the TMDS encoder 332 identifies whether the number of "1"s in the $1^{st}$ 8 bits of the intermediate code 640 equals the number of "0"s in the $1^{st}$ 8 bits of the intermediate code 640. The TMDS encoder then performs an OR operation between the first result and the second result to arrive at determination 710.

FIG. 7B describes the operations performed by the TMDS encoder 332 if the determination 710 is false 720. The TMDS encoder 332 performs the following operations to arrive at determination 722. The TMDS encoder 332 identifies the following four logical results regarding the 8 bits of scrambled data 605. The TMDS encoder 332, for the first result, identifies whether the value of the counter 340 is greater than 0. For the second result the TMDS encoder 332 identifies whether the number of "1"s in the $1^{st}$ 8 bits of the intermediate code 640 is greater than the number of "0"s in the $1^{st}$ 8 bits of the intermediate code 640. For the third result the TMDS encoder 332 identifies whether the value of the counter 340 is less than 0. For the fourth result, the TMDS encoder 332 identifies whether the number of "1"s in the $1^{st}$ 8 bits of the intermediate code 640 is less than the number of "0"s in the $1^{st}$ 8 bits of the intermediate code 640. The TMDS encoder 332 then performs the following logical operations to make determination 722. The TMDS encoder performs an AND operation between the first result and the second result, and another AND operation between the third result and the fourth result. The TMDS encoder 332 then performs an OR operation between the results of the two AND operations.

If the determination 722 is false 724, the TMDS encoder 332 performs the following operations. The $10^{th}$ bit of the output value is set to a value of 0, and the $9^{th}$ bit of the output value is set to equal the value of the $9^{th}$ bit of the intermediate code 640. The output value represents a 10 bit DC balanced code generated by the TMDS encounter 332 for transmission by the transmitter 300. The $1^{st}$ to $8^{th}$ bit of the output is set to equal the values of the $1^{st}$ to $8^{th}$ bits of the intermediate code 640. The new value of the counter 340 is set to the value of the counter minus two times the inverted value of the $9^{th}$ bit of the intermediate code plus the difference between the number of "1"s and the number of "0"s in the $1^{st}$ 8 bits of the intermediate code 640.

If the determination 722 is true 726, the TMDS encoder 332 performs the following operations. The $10^{th}$ bit of the output value is set to a value of 1, and the $9^{th}$ bit of the output value is set to equal the value of the $9^{th}$ bit of the intermediate code 640. The $1^{st}$ to $8^{th}$ bit of the output value is set to equal the inverted values of the $1^{st}$ to $8^{th}$ bits of the intermediate code 640. The new value of the counter 340 is set to equal the value of the counter 340 minus two times the value of the 9$^{th}$ bit of the intermediate code 640 plus the difference between the number of "0"s and the number of "1"s in the 1$^{st}$ 8 bits of the intermediate code 640.

FIG. 7C describes the operations performed by the TMDS encoder 332 if the determination 710 is true 730. On the determination 710 being true, the TMDS encoder 332 performs the following operations. The TMDS encoder 332 sets the 9$^{th}$ bit of the output value equal to the 9$^{th}$ bit of the intermediate code 640. The 10$^{th}$ bit of the output value is set equal to the inversion of the 9$^{th}$ bit of the intermediate code 640. The 1$^{st}$ to 8$^{th}$ bit of the output value is set equal to the 1$^{st}$ to 8$^{th}$ bit of the intermediate code 640 if the 9$^{th}$ bit of the intermediate code 640 is a "1". Alternatively, the 1$^{st}$ to 8$^{th}$ bit of the output value is set equal to the inversion of the 1$^{st}$ to 8$^{th}$ bit of the intermediate code 640 if the 9$^{th}$ bit of the intermediate code 640 is a "0".

The TMDS encoder 332 sets the value of the disparity counter 340 based on the value of the 9$^{th}$ bit of the intermediate code 640. The TMDS encoder 332 determines 734 if the value of the 9$^{th}$ bit of the intermediate code 640 is equal to 0. If the determination 734 is true 736, the TMDS encoder 332 sets the new value of the disparity counter 340 equal to the value of the disparity counter 340 added to the difference between the number of "0"s in the first 1$^{st}$ 8 bits of the intermediate code 640 and the number of "1"s in the 1$^{st}$ 8 bits of the intermediate code 640. If the determination 734 is false 738, the TMDS encoder 332 sets the new value of the disparity counter 340 equal to the value of the disparity counter 340 added to the difference between the number of "1"s in the first 1$^{st}$ 8 bits of the intermediate code 640 and the number of "0"s in the 1$^{st}$ 8 bits of the intermediate code 640.

Upon reading this disclosure, those of skill in the art will appreciate still additional alternative designs for a system that scrambles and encodes data for transmission across the differential pairs of an interface cable such as an HDMI cable 120. Thus, while particular embodiments and applications of the present disclosure have been illustrated and described, it is to be understood that the embodiments are not limited to the precise construction and components disclosed herein and that various modifications, changes and variations which will be apparent to those skilled in the art may be made in the arrangement, operation and details of the method and apparatus of the present disclosure disclosed herein without departing from the spirit and scope of the disclosure as defined in the appended claims.

What is claimed is:

1. A hardware component for communications over a multimedia communication interface, comprising:
   a disparity circuit storing a disparity value indicating a disparity between a number of 1s and a number of 0s transmitted previously; and
   circuitry to:
      receive multimedia data that includes guard band data corresponding to transitions between data periods in the multimedia data;
      generate transition minimized intermediate codes based on the guard band data;
      generate encoded guard band codes based on the transition minimized intermediate codes and the disparity value; and
      transmit the encoded guard band codes via a channel of the multimedia communication interface.

2. The hardware component of claim 1, wherein the circuitry scrambles the guard band data into scrambled guard band data, and the circuitry generates the transition minimized intermediate codes based on the scrambled guard band data.

3. The hardware component of claim 1, wherein the circuitry adjusts the disparity value based on a number of 1s and number of 0s in the encoded guard band codes.

4. The hardware component of claim 1, wherein the multimedia data further includes active video data, and the guard band data corresponds to a leading transition to the active video data.

5. The hardware component of claim 4, wherein the circuitry further:
   generates encoded video codes based on the active video data and the disparity value; and
   transmits the encoded video codes via the channel of the multimedia communication interface, the encoded video codes being transmitted at different times than the encoded guard band codes.

6. The hardware component of claim 1, wherein the multimedia data further includes auxiliary data associated with active video data, and the guard band data corresponds to a leading transition to the auxiliary data or a trailing transition away from the auxiliary data.

7. The hardware component of claim 1, wherein the transition minimized intermediate codes are 9-bit transition minimized values, and the encoded guard band codes are 10-bit direct current balanced values.

8. The hardware component of claim 1, wherein the multimedia data further includes control data, and the circuitry further:
   resets the disparity value of the disparity circuit responsive to the control data;
   generates encoded control codes based on the control data without using the disparity value; and
   transmits the encoded control codes via the channel of the multimedia communication interface, the control codes being transmitted at different times than the encoded video codes and the encoded guard band codes.

9. A non-transitory computer readable medium storing a representation of a hardware component for communications over a multimedia communication link, the hardware component comprising:
   a disparity circuit storing a disparity value indicating a disparity between a number of 1s and a number of 0s transmitted previously; and
   circuitry to:
      receive multimedia data that includes guard band data corresponding to transitions between data periods in the multimedia data
      generate transition minimized intermediate codes based on the guard band data;
      generate encoded guard band codes based on the transition minimized intermediate codes and the disparity value; and
      transmit the encoded guard band codes via a channel of the multimedia communication interface.

10. The non-transitory computer readable medium of claim 9, wherein the circuitry scrambles the guard band data into scrambled guard band data, and the circuitry generates the transition minimized intermediate codes based on the scrambled guard band data.

11. The non-transitory computer readable medium of claim 9, wherein the circuitry adjusts the disparity value based on a number of 1s and number of 0s in the encoded guard band codes.

12. The non-transitory computer readable medium of claim 9, wherein the multimedia data further includes active video data, and the guard band data corresponds to a leading transition to the active video data.

13. The non-transitory computer readable medium of claim 12, wherein the circuitry further:
generates encoded video codes based on the active video data and the disparity value; and
transmits the encoded video codes via the channel of the multimedia communication interface, the encoded video codes being transmitted at different times than the encoded guard band codes.

14. The non-transitory computer readable medium of claim 9, wherein the multimedia data further includes auxiliary data associated with active video data, and the guard band data corresponds to a leading transition to the auxiliary data or a trailing transition away from the auxiliary data.

15. The non-transitory computer readable medium of claim 9, wherein the transition minimized intermediate codes are 9-bit transition minimized values, and the encoded guard band codes are 10-bit direct current balanced values.

16. The non-transitory computer readable medium of claim 9, wherein the multimedia data further includes control data, and the circuitry further:
resets the disparity value of the disparity circuit responsive to the control data;
generates encoded control codes based on the control data without using the disparity value; and
transmits the encoded control codes via the channel of the multimedia communication interface, the control codes being transmitted at different times than the encoded video codes and the encoded guard band codes.

17. A method of operation in a hardware component for communications over a multimedia communication link, the method comprising:
receiving a disparity value indicating a disparity between a number of 1s and a number of 0s transmitted previously;
receiving multimedia data that includes guard band data corresponding to transitions between data periods in the multimedia data;
generating transition minimized intermediate codes based on the guard band data;
generating encoded guard band codes based on the transition minimized intermediate codes and the disparity value; and
transmitting the encoded guard band codes via a channel of the multimedia communication interface.

18. The method of claim 17, further comprising:
scrambling the guard band data into scrambled guard band data, and generating the transition minimized intermediate codes based on the scrambled guard band data.

19. The method of claim 17, further comprising:
adjusting the disparity value based on a number of 1s and number of 0s in the encoded guard band codes.

20. The method of claim 17, wherein the transition minimized intermediate codes are 9-bit transition minimized values, and the encoded guard band codes are 10-bit direct current balanced values.

* * * * *